(12) United States Patent
Patel et al.

(10) Patent No.: US 11,997,064 B2
(45) Date of Patent: May 28, 2024

(54) HIGH AVAILABILITY NETWORK ADDRESS TRANSLATION

(71) Applicant: Arrcus Inc., San Jose, CA (US)

(72) Inventors: Keyur Patel, San Jose, CA (US); Sujay Gopinathan, Fremont, CA (US); Sreekanth Kannan, Fremont, CA (US); Arthi Ayyangar, Los Altos, CA (US)

(73) Assignee: Arrcus Inc., San Jose, CA (US)

( * ) Notice: Subject to any disclaimer, the term of this patent is extended or adjusted under 35 U.S.C. 154(b) by 321 days.

(21) Appl. No.: 17/000,189

(22) Filed: Aug. 21, 2020

(65) Prior Publication Data

US 2022/0060441 A1 Feb. 24, 2022

(51) Int. Cl.
*H04L 61/2567* (2022.01)
*H04L 12/46* (2006.01)
*H04L 41/0816* (2022.01)
*H04L 67/1008* (2022.01)
*H04L 67/1034* (2022.01)
*H04L 101/622* (2022.01)

(52) U.S. Cl.
CPC ...... *H04L 61/2567* (2013.01); *H04L 12/4675* (2013.01); *H04L 41/0816* (2013.01); *H04L 67/1008* (2013.01); *H04L 67/1034* (2013.01); *H04L 2101/622* (2022.05)

(58) Field of Classification Search
CPC ............. H04L 61/2567; H04L 67/1034; H04L 12/4675; H04L 67/1008; H04L 41/0816; H04L 61/6022; H04L 69/40; H04L 41/0668; H04L 61/256; H04L 61/2532; H04L 12/4641
See application file for complete search history.

(56) References Cited

U.S. PATENT DOCUMENTS 7,139,926 B1* 11/2006 Madhav ................. H04L 67/14
714/4.11
7,814,232 B2* 10/2010 Satapati .............. H04L 67/1001
709/249

(Continued)

OTHER PUBLICATIONS

N. Ayari, D. Barbaron, L. Lefevre and P. Primet, "Fault tolerance for highly available internet services: concepts, approaches, and issues," in IEEE Communications Surveys & Tutorials, vol. 10, No. 2, pp. 34-46, Second Quarter 2008, doi: 10.1109/COMST.2008.4564478. (Year: 2008).*

(Continued)

*Primary Examiner* — Hitesh Patel
*Assistant Examiner* — Alex H. Tran
(74) *Attorney, Agent, or Firm* — David R. Stevens; Stevens Law Group

(57) ABSTRACT

A computing environment, such as a cloud computing environment, may include nodes performing NAT for a plurality of workloads. An active node performs NAT for the workloads, including maintaining a NAT table. The active node may create sub-interfaces for the workloads and function as a DHCP server. The NAT table and sub-interfaces may be recreated on a standby node. Upon detecting failure, a routing table is updated to direct workloads to connect to the standby node and traffic may continue to be processed by the standby node without disrupting network or application sessions.

16 Claims, 7 Drawing Sheets

(56) References Cited

U.S. PATENT DOCUMENTS

| | | | | |
|---|---|---|---|---|
| 7,895,358 B2* | 2/2011 | Shimmura | | H04L 69/40 |
| | | | | 709/201 |
| 7,974,186 B2* | 7/2011 | Yonezawa | | H04L 41/0654 |
| | | | | 709/227 |
| 9,641,415 B2* | 5/2017 | Stoyanov | | H04L 41/0668 |
| 10,601,705 B2* | 3/2020 | Hira | | H04L 45/42 |
| 10,666,503 B1* | 5/2020 | Kryvokrysenko | | H04L 67/10 |
| 2003/0233452 A1* | 12/2003 | Maufer | | H04L 61/256 |
| | | | | 709/225 |
| 2006/0047836 A1* | 3/2006 | Rao | | H04L 67/14 |
| | | | | 709/229 |
| 2006/0215654 A1* | 9/2006 | Sivakumar | | H04L 61/2575 |
| | | | | 370/389 |
| 2011/0173296 A1* | 7/2011 | He | | H04W 12/069 |
| | | | | 709/217 |
| 2014/0282542 A1* | 9/2014 | Smith | | H04L 49/70 |
| | | | | 718/1 |
| 2018/0034769 A1* | 2/2018 | Modi | | H04L 67/1021 |
| 2019/0306036 A1* | 10/2019 | Boutros | | H04L 43/0805 |
| 2020/0389817 A1* | 12/2020 | Bhatnagar | | H04L 67/1008 |
| 2021/0103507 A1* | 4/2021 | Pfister | | H04L 61/2503 |

OTHER PUBLICATIONS

S. Sharma, Jiawu Chen, Wei Li, K. Gopalan and Tzi-cker Chiueh, "Duplex: a reusable fault tolerance extension framework for network access devices," 2003 International Conference on Dependable Systems and Networks, 2003. Proceedings., 2003, pp. 501-510, doi: 10.1109/DSN.2003.1209960. (Year: 2003).*

* cited by examiner

HIGH AVAILABILITY NETWORK ADDRESS TRANSLATION

BACKGROUND

It is advantageous in many situations to have a public address used by an entity be different from a private address used by the entity. The public address may be used as the source and destination address of packets transmitted and received over an external network. The private address may be used as the source and destination address of packets transmitted and received over an internal network. Translation between the public and private addresses, known as network address translation (NAT) may be performed by a networking element, such as a router, switch, network gateway, or other computing device.

Network address translation is particularly useful for applications executing in a cloud computing environment inasmuch as the network environment in which applications execute is virtualized. Applications executing on premise equipment may also benefit from address translation.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
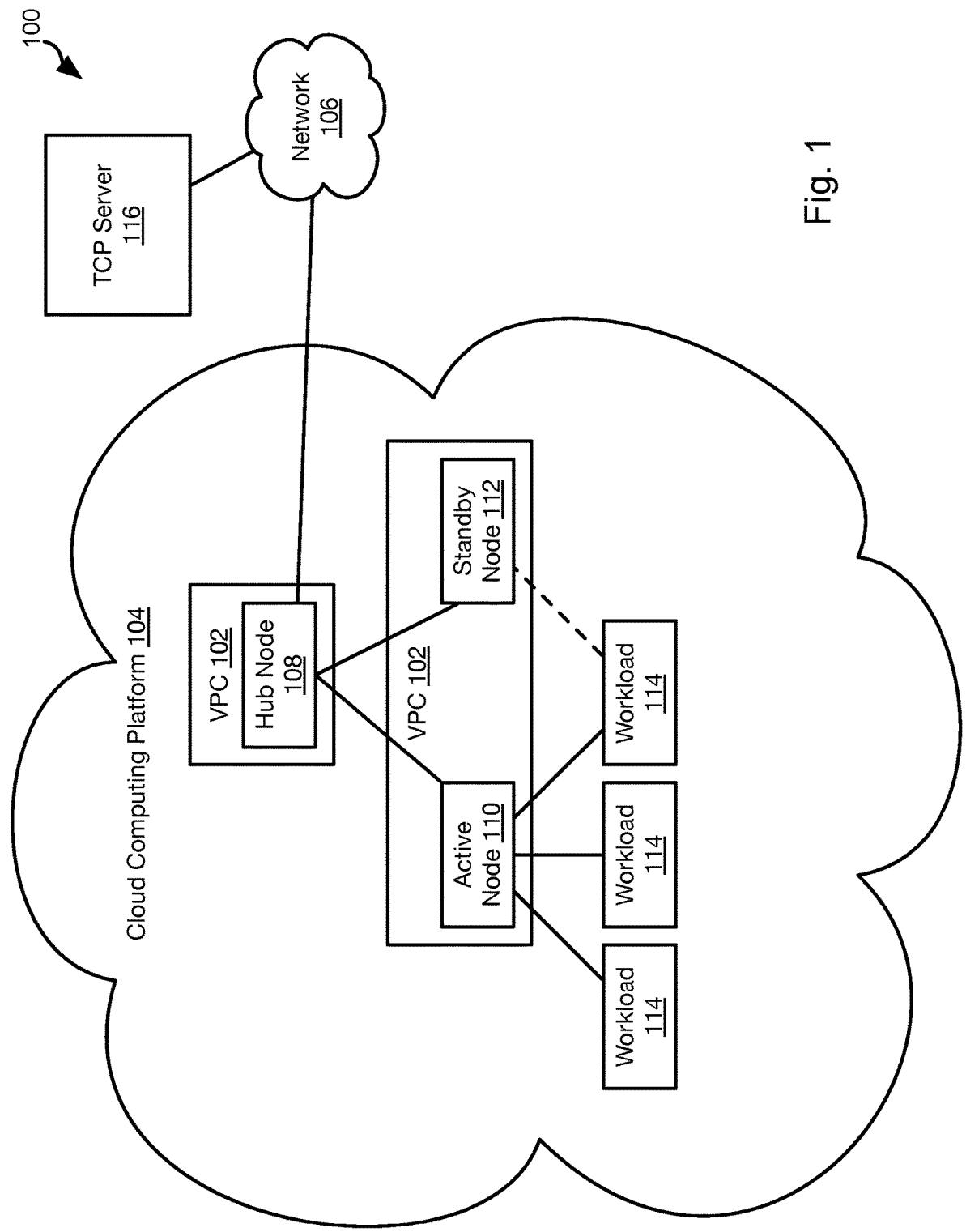
FIG. 1 is schematic block diagram of a network environment for implementing low-latency NAT in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1, illustrates an example of an network environment 100 in which low latency network address translation (NAT) may be performed. The network environment 100 may include a plurality of virtual private clouds (VPC) 102 executing on a cloud computing platform 104. The cloud computing platform 104 may be any cloud computing platform known in the art, such as AMAZON WEB SERVICES (AWS), MICROSOFT AZURE, GOOGLE CLOUD, or other cloud computing platform. As known in the art, a cloud computing platform 104 provides virtualized computing and storage resources that may be accessed over a network 106 by customers. The VPC 102 may function as a logically isolated section of the cloud computing platform 104 in which networking, including interne protocol (IP) addresses, subnets, routing tables, network gateways, and other networking elements are isolated from other portions of the could computing platform and therefore need not be globally unique.

Each VPC 102 may execute one or more nodes 108, 110, 112. The nodes 108, 110, 112 may each be an application executing within a VPC 102, such as within a virtual machine, container, or other execution environment executing within the VPC 102. Each node 108, 110, 112 may function as a networking element and provide a gateway between the VPC 102 and other VPCs 102 as well as to an external network 106 connected to the cloud computing platform 104.

In the illustrated embodiment, one or more nodes are hub nodes 108 that are connected to the external network 106 and other spoke nodes 110, 112 may send and receive traffic relative to the external network 106 through the hub node 108. In the illustrated embodiment, the hub node 108 is in a different VPC than the spoke nodes 110, 112. In some embodiments, the spoke nodes 110, 112 each have a virtual private network (VPN) session established with the hub node 108. For example, the VPN sessions may be according to a layer two tunneling protocol (L2TP).

Each VPC 102 may further execute one or more workloads 114. Each workload 114 may communicate with workloads of other VPCs 102 and with the external network 106 by means of the node 110, 112 in the VPC hosting the workload 114. Each workload 114 may therefore have a network connection, such as a virtualized local area network (VLAN) connection, to the node 110, 112 of that VPC. Each workload 114 may be an application, daemon, network service, operating system, container, or any computing process capable of execution by a computer.

In the illustrated embodiments, one node 110 may be active for one or more workloads 114 whereas another node 112 is a backup or standby node 112 for the node 110. The active node 110 and standby node 112 may be located within the same VPC 102 such that workloads may connect to either of the nodes 110, 112 through the internal virtual network of the VPC 102.

As discussed herein, the active node 110 may maintain a network session with components that are external to the VPC 102 and possibly external to the cloud computing platform 104. The network session may be a transport control protocol (TCP) session with a TCP server 116 connected to the external network 106. The network session may additionally or alternatively be an application session established between an external application connected to the TCP server 116 and a workload 114.

The approach described herein enables a workload 114 to maintain a session even if the active node 110 fails. In some instances failure of a TCP session may result in a large timeout period before the parties of the session perform handshaking to reestablish the session. Likewise, an application session may have a large timeout period before the applications attempt to reestablish a new application session. The process of reestablishing a new application session is time consuming and may result in the loss of data. The ability to deal with failure of a node 110, 112 without interrupting of network sessions is therefore of great benefit.

Figure 2:
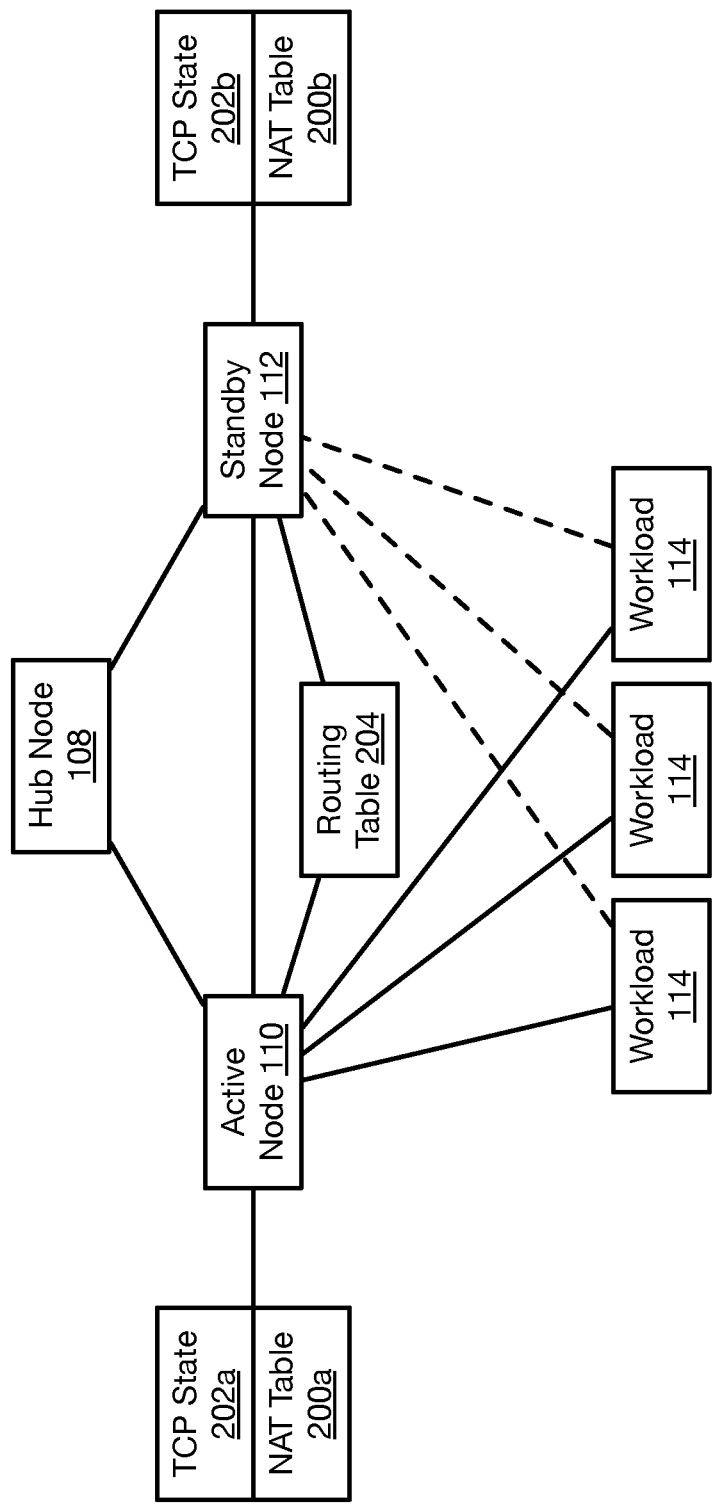
FIG. 2 is a schematic block diagram illustrating performing NAT failover between an active node and a standby node in accordance with an embodiment of the present invention.

Referring to FIG. 2, the active node 110 may maintain various data structures describing the state of network interfaces managed by the active node 110. This may include a NAT table 200a that includes a mapping between the private IP address (within the VPC 102) and public IP address (address used external to the VPC 102) of each workload 114. The assignments of one or both of public and private IP addresses may be dynamic such that assignments are made and released by workloads according to communication requirements.

For example, the hub node 108 may act as a dynamic host configuration protocol (DHCP) server. The active Node 110 may operate as a dynamic NAT server. Accordingly, a public IP address leased to the active node 110 by the DHCP server may be dynamically mapped by the active node 110 to a private IP address of a workload 114. The active node 110 may map the public IP address to a different workload 114, such as when the first workload completes a transmission or expiration of a predefined time period The public IP assignments made by the hub node 108 may be stored by the hub node 108 in the NAT table 200a of the active node 110 for each assignment of a public IP address such that the public IP address is mapped to the private IP address of the workload 114 that was assigned the public IP address by the active node 110 when performing dynamic NAT on behalf of the workload 114.

In some embodiments, the private IP address may be assigned to a sub-interface of the VPN session connecting the active node 110 to the hub node 108. For example, the hub node 108 may create a sub-interface for the workload 114 that includes a MAC (media access control) address of the workload. The sub-interface may further be assigned one or both of the public IP address and the private IP address assigned to that workload 114. For each sub-interface created on the active node 110, the hub node 108 may create another sub-interface on the VPN connection between the standby node 112 and the hub node 108 that has the same MAC address and the same public IP address and private IP address. In some embodiments, a sub-interface with the same MAC address is created on the standby node 112, which then attempts to obtain one or both of a public and private IP address for the interface. The hub node 108 will then assign that sub-interface the same public and private IP addresses as the active node 110 according to DHCP since the MAC address of the standby node 112 is the same as the interface on the active node 110.

The active Node 110 will update the routing table 204, such that the default route for the workloads 114 will point the network interface of Active Node 110. The routing table 204 may likewise reference the active node 110 as the network gateway for the VPC 102.

The active node 110 may also maintain a TCP state 202a. The TCP state 202a may maintain the state of TCP connections for the public IP addresses of the workload 114. As known in the art, a TCP connection may implement a state machine that is changed according to interactions between the components connected by the TCP connection. Accordingly, the TCP state 202a may be this state machine for each TCP connection of each workload 114.

The standby node 112 may maintain its own copies of the NAT table 200a and TCP states 202b. The active node 110 may communicate changes to the TCP states 202a to the standby node 112 as they occur and the standby node 112 may update TCP states 202b with these updates. In some embodiments, communication of updates to the TCP states is performed by the active node 110 and transmitted by way of the hub node 108. In others, the updates are performed by direct communication between the nodes 110, 112.

In addition to sharing updates to the NAT table 200a and TCP state 202a, the nodes 110, 112 may communicate one another to facilitate detection of failure of the active node 110. This communication may be performed using the same connection used to share updates to the NAT table 200a and TCP state 202a and may be a direct connection within the VPC 102 or by way of the hub node 108. This communication may include "still alive" messages transmitted at predefined intervals (e.g., 100 ms to 2 seconds) from the active node 110 to the standby node 112. The standby node 112 may therefore detect failure of the active node 110 in response to failing to receive a still alive message within a threshold time period from a last-received still alive message. In other embodiments, the standby node 112 periodically (e.g., every 100 ms to 2 seconds) transmits queries the active node 110 and will detect failure of the active node 110 in response to failing to receive a response to a query within a threshold time period from when the query was transmitted.

Figure 3:
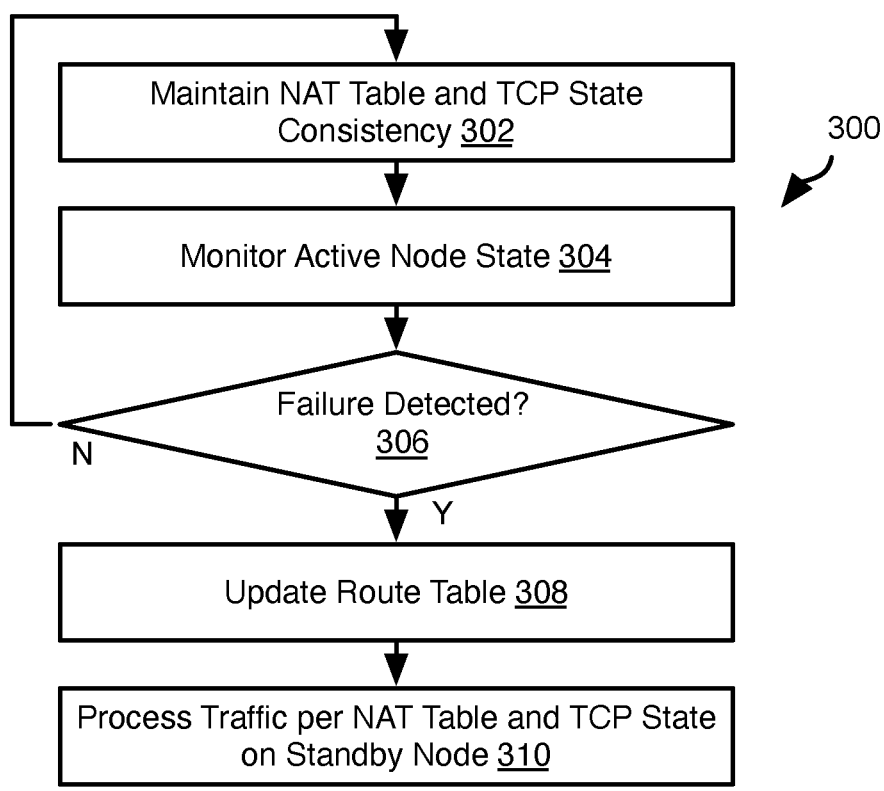
FIG. 3 is a process flow diagram of a method for performing NAT failover between an active node and a standby node in accordance with an embodiment of the present invention.

Referring to FIG. 3, while still referring to FIG. 2, the active node 110 and standby node 112 may implement the illustrated method 300. The method 300 may include maintaining 302 consistency between the NAT tables 200a, 200b and between the TCP states 202a, 202b. As noted above, this may include transmitting updates from the active node 110 to the standby node 112 as the NAT table 200a and TCP state 202a are changed. These updates may be transmitted directly or by way of the hub node 108. Updates may include adding and deleting entries in the NAT table 200b as the corresponding entries are created and deleted in the NAT table 200a. Updates may also include creating and deleting state machines for TCP connections as they are created and ended on the active node 110. Step 302 may further include creating and deleting sub-interfaces for workloads 114 on the standby node 112 as described above as the corresponding sub-interface on the active node are created and deleted.

The method 300 may include monitoring 304 the state of the active node 110 by the standby node 112. This may include monitoring still alive messages transmitted by the active node 110. This may additionally or alternatively include monitoring responses to queries transmitted by the standby node 112.

The method 300 may include the standby node 112 detecting 306 failure of the active node 110. As noted above this may include failure to receive a still alive message within a threshold time period from a previous still alive message or failing to receive a response to a query within a threshold time period from when the query was transmitted.

If failure is detected 306, the method 300 may include updating 308 the routing table 204 to replace a reference to the active node 110 with a reference to the standby node 112. In particular, this may include referencing the standby node 112, e.g., the private IP address of the standby node 112, as the default gateway for the VPC 102.

The standby node 112, which is now the active node for the VPC 102, will then process 310 traffic received from the workload 114 and from the external network 106 according to its copy of the NAT table 200b and the TCP states 202b. In particular, the standby node 112 may perform functions ascribed herein to the active node 110 in functioning as a network gateway, including performing NAT, managing TCP state machines, and any of the other functions ascribed herein to the active node 110.

Note that there may be some dropped packets during the transition from the active node 110 to the standby node 112. However, the TCP protocol provides for retransmission of dropped packets. Accordingly, the TCP sessions remain up and do not need to be reestablished. Likewise, any application sessions may continue to operate undisturbed since the same sub-interfaces are available for each workload 114 on the standby node 112. The lack of disruption is also due to the NAT table 200b remaining the same such that applications configured to communicate with the public IP address of a workload do not need to acquire new addresses and establish new application and TCP sessions for the new addresses. In some embodiments, after the standby node 112 is made the active node, it may also function as a NAT server for the workloads of the VPC 102.

As noted above, sub-interfaces to the VPN connections between the nodes 110, 112 and the hub node 108 may be created for each workflow 114 such that, for each sub-interface created on the VPN connection between the active node 110 and hub node 108, a correspond sub-interface with the same public and private IP addresses and MAC address is created on the VPN connection between the standby node 112 and the hub node 108. Accordingly, step 310 may include, for each workload 114, transmitting traffic (e.g., TCP packets) over the sub-interface of the standby node 112 having the same public and private IP addresses and MAC address as the sub-interface of the active node 110 that was previously used by the each workload. Accordingly, the delay that would result from creating a new sub-interface is avoided in the event of failure.

The changing of routing of traffic to and from the workload 114 may occur due to the standby node 112 becoming the new default gateway and due to the MAC address and private IP address of the workloads 114 staying the same: traffic received by the standby node 112 referencing the MAC address or private IP address of a workload 114 will be routed through the appropriate sub-interface associated with that MAC address and private IP address.

In some embodiments, if the active node 110 resumes operation following failure, the active node 110 may function as a standby node, i.e., receive duplicate information for NAT tables 200b, TCP states 202b, and/or duplicate sub-interfaces on its VPN connection to the hub node 108 as described above with respect to the standby node 112. Once this information is current relative to the standby node 112, the active node 110 may again become active and the standby node 112 will again function as a standby node.

The embodiments of FIGS. 1 through 3 is shown as being implemented in a cloud computing platform 104. This approach may also be implemented by any computing nodes, including premise equipment connected such that one may operate as a hub node with respect to spoke nodes as described above.

Figure 4:
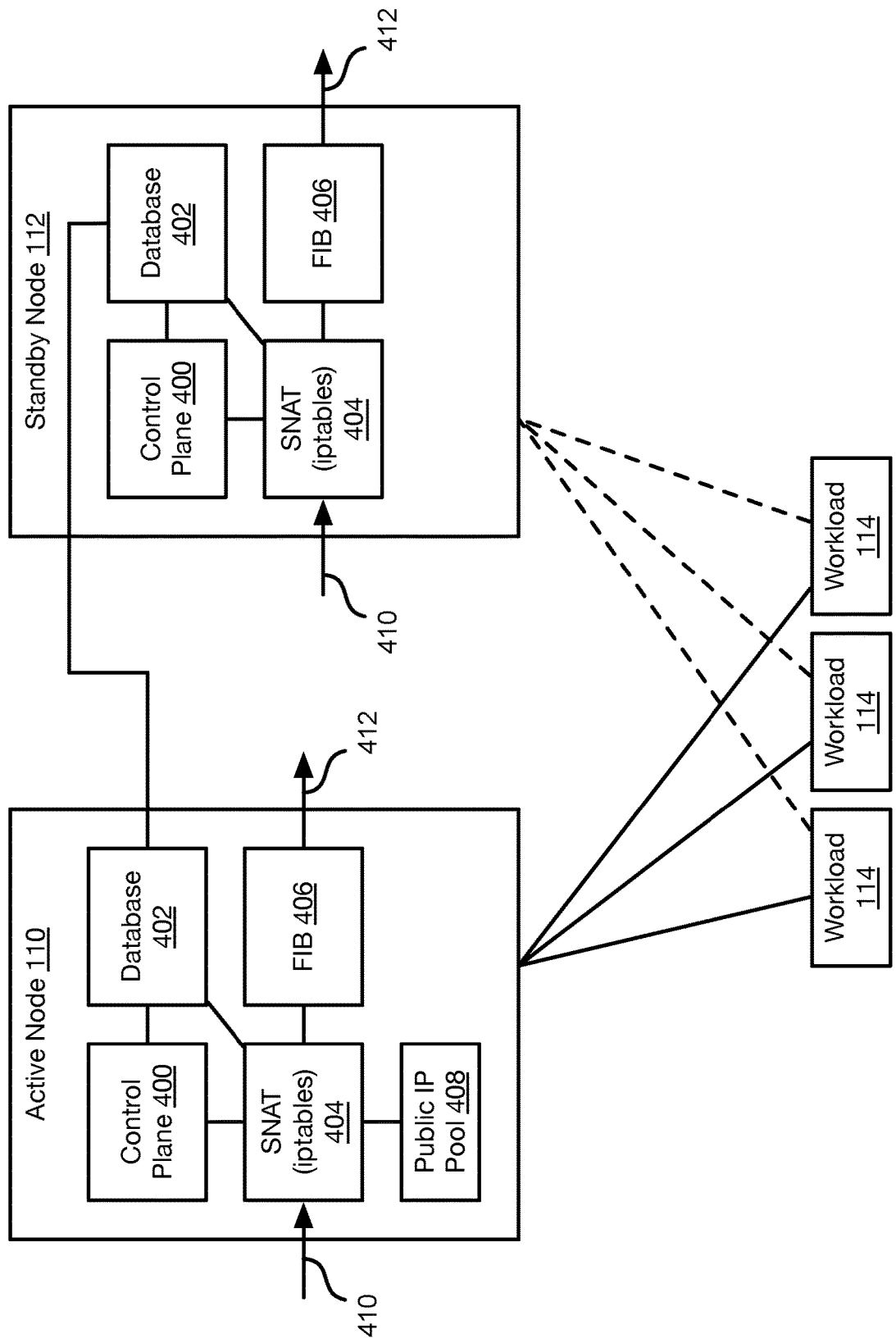
FIG. 4 is a schematic block diagram of components implementing an alternative approach for NAT failover between an active node and a standby node in accordance with an embodiment of the present invention.

FIG. 4 illustrates a configuration in which the active node 110 and the standby node 112 are not connected by a hub node 108. The nodes 110, 112 may execute within a VPC 102 or on separate computing devices of an on-premise network. In the illustrated configuration, the active node 110 and standby node 112 are assigned a static pool of IP addresses and the active node 110 functions as a DHCP server for workloads 114 and as a NAT server.

In the illustrated embodiment, each node 110, 112 includes a control plane 400 that may implement logic for performing functions of each node 110, 112 as an active node 110 and a standby node 112 respectively as described herein. For whichever node 110, 112 is active, the control plane may act as the DHCP and NAT server with respect to workload 114 connecting to an external network 106 through the active node 110.

Each node 110, 112 may include or access a database 402. The databases 402 may be synchronized such that the database 402 of the standby node 112 is updated to be the same as the database 402 of the active node 110. For example, the databases 402 may be REDIS databases that are configured to synchronize with one another.

The active node 110 may create a NAT table, such as a secure NAT (SNAT) table, that maps private addresses to MAC addresses of workloads 114 and maps private addresses assigned to workloads 114 to the public address assigned to that workload 114. The SNAT mappings may also be recorded in a kernel IP table of the device (actual or virtual) executing the active node 110. As noted above, there may be a static pool 408 of IP addresses managed by the active node 110 such that public and/or private IP addresses are returned to the pool 408 and later assigned to a second workload 114 after a first workload that was assigned the public and/or private IP addresses completes a tasks or its lease to the public and/or private IP address expires.

The nodes 110, 112 may further include a forwarding information base FIB 406 or other data structure that defines the routing of packets received by the node 110, 112. In particular, the FIB 406 may define what output port to output a packet received on a particular input port. Accordingly, the FIB 406 may be configured to route packets addressed to external IP addresses to the external network 106 and to route received packets addressed to public IP addresses to the private IP addresses of the workloads 114 assigned the public IP addresses in the SNAT table 404.

The SNAT table 404, the FIB 406 of the active node 110, and other information such as TCP state information may be written to the database 402 of the active node 110. The database 402 may then synchronize with the database 402 of the standby node 112. The standby node 112 may then populate its SNAT table 404 and FIB 406 according to the database 402 in order to be prepared for failure of the active node 110.

When a particular node 110, 112 is the active node, ingress traffic 410 is received, translated according to the SNAT table, and then output as output traffic 412 to an egress port or the kernel of the computing device (actual or virtual) executing the node 110, 112 as defined in the FIB 406.

Figure 5:
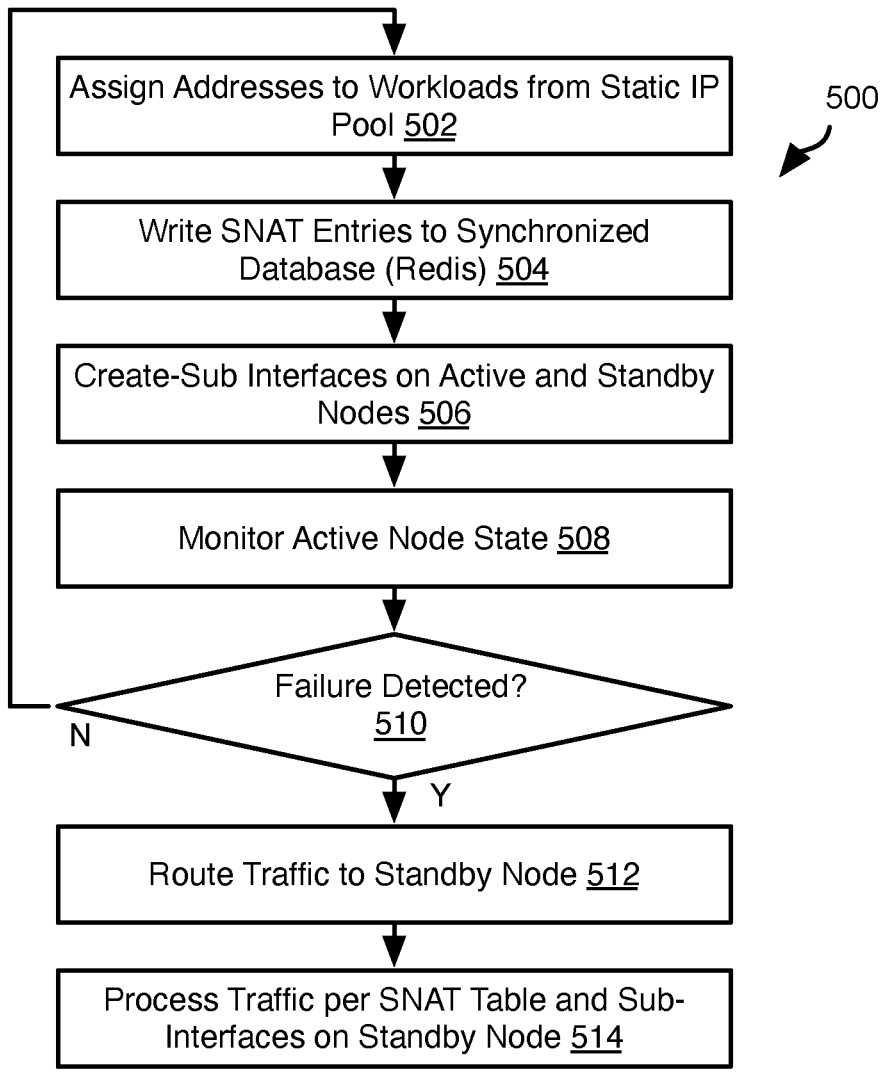
FIG. 5 is a process flow diagram of an alternative method for performing NAT failover between an active node and a standby node performing NAT in accordance with an embodiment of the present invention for pe in accordance with an embodiment of the present invention.

Referring to FIG. 5, the illustrated method 500 may be performed using the system shown in FIG. 4. The method 500 may be executed by the active node 110 except where actions are ascribed to the standby node 112.

The method 500 may include assigning 502 IP addresses to each workload 114 from the static IP pool. This may be performed according to DHCP or other IP configuration protocol. Step 502 may further include making entries in the SNAT table 404. The method 500 further includes writing 504 entries to the SNAT table 404 in the synchronized database 402. As a result, the data in the database 402 will be replicated to the database 402 of the standby node 112.

For each workload 114 assigned an IP address at step 502, the active node may further create 506 a sub-interface to the workload 114 that is assigned the static IP (e.g., a static public IP address) and referencing the MAC address of the workload 114. Traffic to and from the workload 114 may therefore be routed through the sub-interface by the active node 110. A corresponding sub-interface may also be created on the standby node 112 that references the public IP address assign to the workload 114 and the MAC address of the workload 114. The private IP address of the workload 114 may also be associated with the sub-interfaces on the nodes 110, 112.

The reverse of steps 504 and 506 are also performed: as workloads 114 relinquish private and/or public IP addresses, the corresponding entries in the SNAT table 404 may be deleted and sub-interfaces for the workloads 114 may likewise be deleted. The corresponding SNAT table entries and sub-interfaces on the standby node 112 may likewise be deleted in order to maintain consistency. These updates may be communicated by way of updating the database 402 of the active node 110, resulting in updating of the database 402 of the standby node 112 to indicate deleted information.

The method 500 may further include monitoring 508 status of the active node 110 and detecting 510 failure of the active node 110. This may be performed as described above with respect to steps 304 and 306 of the method 300 using periodic still alive messages or queries.

When failure is detected 510, traffic may be routed 512 to the standby node 112 instead of the active node 110. Changing of routing may be implemented by changing a routing table 204 in a VPC 102 including the nodes 110, 112. Changing of routing may include configuring the workloads 114 to use the standby node 112 as a default gateway.

The standby node 112 may then process 514 traffic received according to the SNAT tables 404, sub-interfaces, FIB 406, TCP states, or other data received from the active node 110 prior to failure. In particular, the standby node 112 may perform functions ascribed herein to the active node 110 in functioning as a network gateway, including performing NAT, managing TCP state machines, routing according to FIB 406, and any of the other functions ascribed herein to the active node 110.

As for the embodiments of FIGS. 1 through 3, the standby node 112 is already configured with some or all of SNAT tables 404, FIB 406, and sub-interfaces for the workloads 114 prior to failure occurring and can therefore route traffic to and from the workloads 114 without disrupting higher level network sessions such as TCP sessions and application sessions.

As for the embodiments of FIGS. 1 through 3, the approach of FIGS. 4 and 5 may be implemented in a cloud computing platform 104 or on premise equipment such that each node 110, 112 executes on a different computing device. The workloads 114 may execute on the same premise equipment as the nodes 110, 112 or different premise equipment.

As for the embodiments of FIGS. 1 through 3, if the active node 110 resumes operation following failure, the active node 110 may function as a standby node, i.e., receive duplicate information for SNAT table 404, FIB, and/or sub-interfaces from the standby node 112. Once this information is current relative to the standby node 112 and corresponding sub-interfaces are created on the active node 110, the active node 110 may again become active and the standby node 112 will again function as a standby node.

Figure 6:
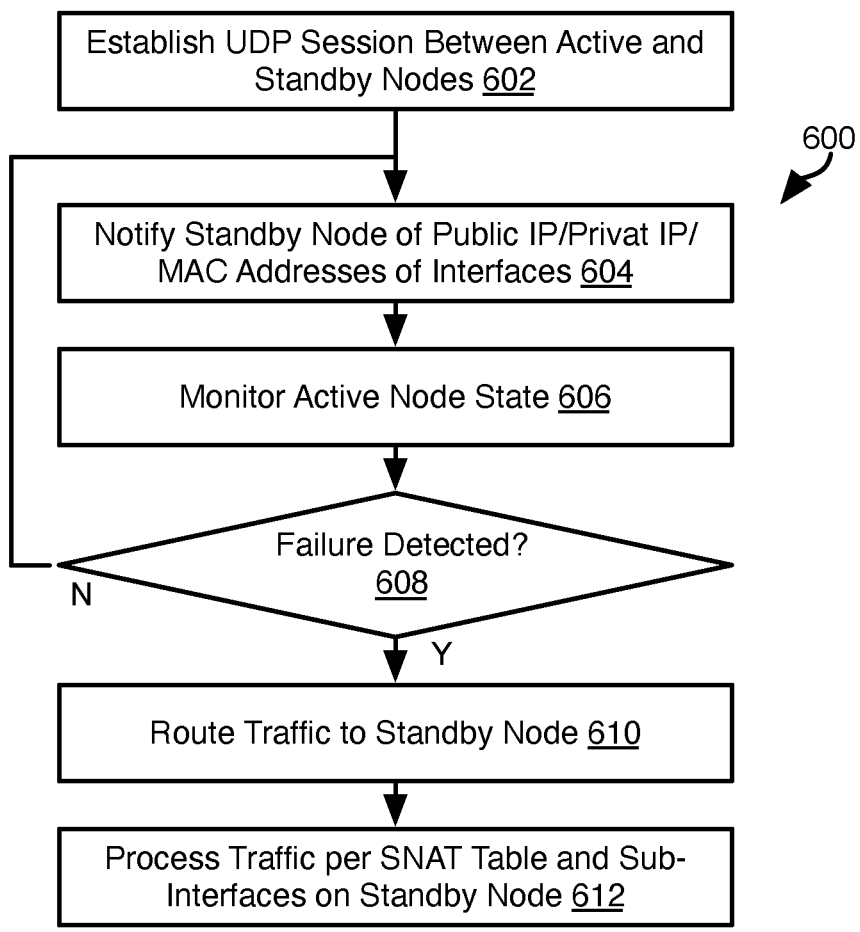
FIG. 6 is a process flow diagram of another alternative method for performing NAT failover between an active node and a standby node performing NAT in accordance with an embodiment of the present invention.

FIG. 6 illustrates a method 600 that may be used to perform failover between the active node 110 and the standby node 112 in the absence of a synchronized database 402 in each node 110, 112.

In the method 600, the active node 110 and standby node 112 establish 602 a connection between them. In the illustrated embodiment, this is a user datagram protocol (UDP) connection. The active node 110 will then notify 604 the standby node 112 over this connection. The notifications may include notifications of sufficient information to enable the standby node 112 to recreate sub-interfaces for workloads 114 created on the active node 110. The notifications may include information such as the private IP address, the public IP address mapped to the public IP address in the SNAT table, and the MAC address of the workload 114. The standby node 112 will therefore create a sub-interface having the private IP address, public IP address, and MAC address as indicated in the notification.

Notifications may also include notifications that an interface has been deleted or a SNAT table entry has been deleted, such as due to workload finishing a network session or otherwise relinquishing a private and/or public IP address. Accordingly, the standby node 112 will delete the interface referenced in the notification and/or update its SNAT table to delete an entry referenced in the notification.

The method 600 may further include monitoring 606 status of the active node 110 and detecting 608 failure of the active node 110. This may be performed as described above with respect to steps 304 and 306 of the method 300 using periodic still alive messages or queries.

When failure is detected 608, traffic may be routed 610 to the standby node 112 instead of the active node. Changing of routing may be implemented by changing a routing table 204 in a VPC 102 including the nodes 110, 112. Changing of routing may include configuring the workloads 114 to use the standby node 112 as a default gateway.

The standby node 112 may then process 612 the traffic according to the SNAT table 404, FIB 406, TCP states, and/or sub-interfaces as received from the active node 110. In particular, the standby node 112 may perform functions ascribed herein to the active node 110 in functioning as a network gateway, including performing NAT, managing TCP state machines, routing according to FIB 406, and any of the other functions ascribed herein to the active node 110.

As for the embodiments of FIGS. 1 through 3, the approach of FIG. 6 may be implemented in a cloud computing platform 104 or on premise equipment such that each node 110, 112 executes on a different computing device. The workloads 114 may execute on the same premise equipment as the nodes 110, 112 or different premise equipment.

As for the embodiments of FIGS. 1 through 3, if the active node 110 resumes operation following failure, the active node 110 may function as a standby node, i.e., receive duplicate information for SNAT table 404, FIB, and/or sub-interfaces from the standby node 112. Once this information is current relative to the standby node 112 and corresponding sub-interfaces are created on the active node 110, the active node 110 may again become active and the standby node 112 will again function as a standby node.

Figure 7:
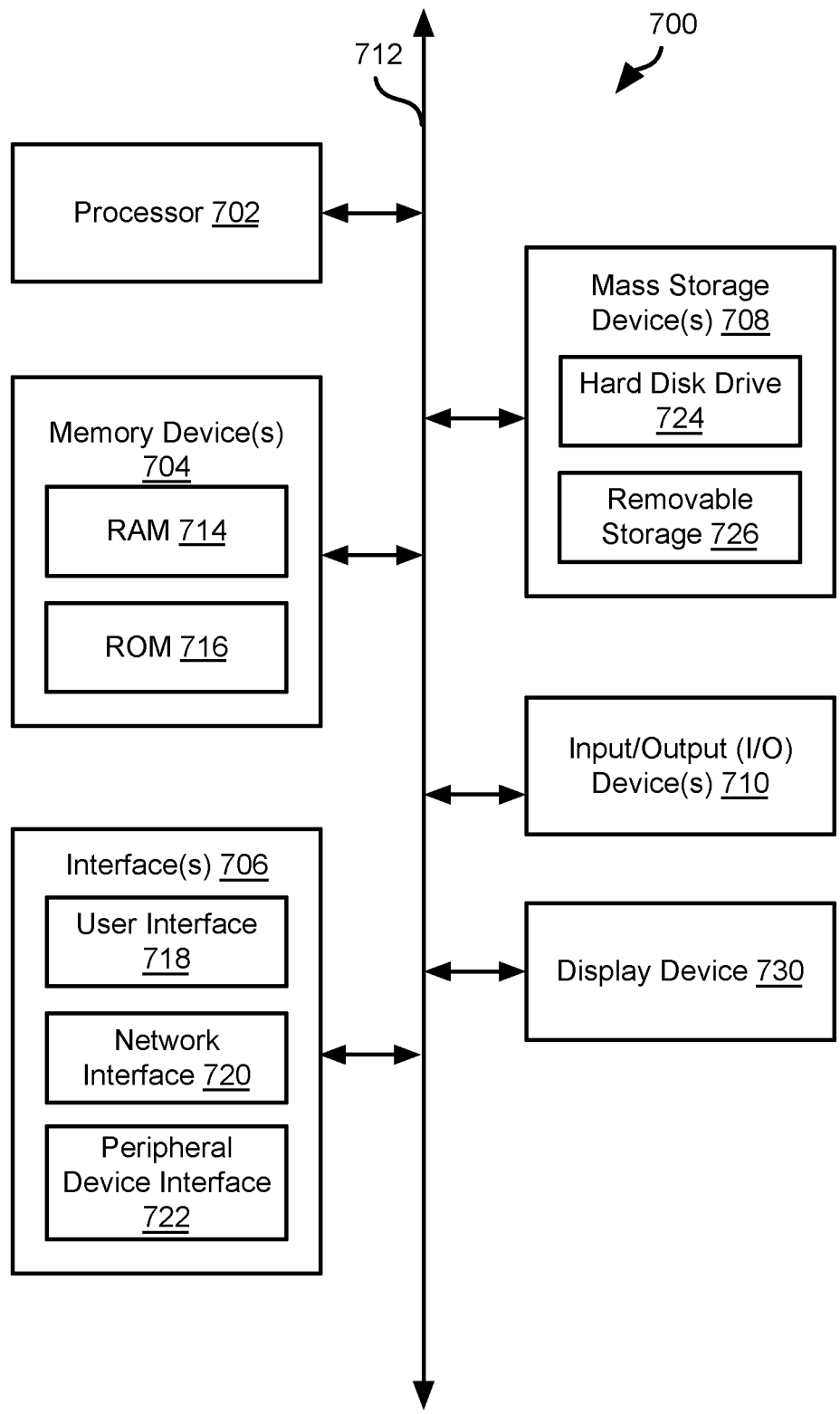
FIG. 7 is a schematic block diagram of a computer system suitable for implementing methods in accordance with embodiments of the present invention.

FIG. 7 is a block diagram illustrating an example computing device 700 which can be used to implement the system and methods disclosed herein. In particular, a node 108, 110, 112 according to any of the embodiments described above may have some or all of the attributes of a computing device 700. Likewise, a cloud computing platform maybe composed of devices having some or all of the attributes of the computing device 709.

Computing device 700 may be used to perform various procedures, such as those discussed herein. Computing device 700 can function as a server, a client, or any other computing entity. Computing device can perform various monitoring functions as discussed herein, and can execute one or more application programs, such as the application programs described herein. computer, a notebook computer, a server computer, a handheld computer, tablet computer and the like.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method comprising:
providing a plurality of workloads executing in a computing environment including a plurality of computing devices each including a processing device and a memory device;
providing a first node executing in the computing environment, the first node programmed to act as a first gateway between the computing environment and an external network by performing network address translation (NAT), the computing environment being configured to cause the plurality of workloads to communicate with the external network through the first node;
providing a second node executing in the computing environment programmed to act as a second gateway between the computing environment and the external network by performing NAT;
configuring the second node to mirror a NAT state of the first node;
detecting, by the second node, failure of the first node;
creating first interfaces to the plurality of workloads on the first node and creating second interfaces to the plurality of workloads on the second node that are identical to the first interfaces;
in response to detecting failure of the first node, performing by the second node:
configuring the computing environment to cause the plurality of workloads to communicate with the external network through the second node using the second interfaces, the second interfaces being created prior to failure of the first node; and
performing NAT according to the NAT state of the first node;
wherein the first interfaces have media access code (MAC) addresses of the plurality of workloads associated therewith and the second interfaces have the MAC addresses associated therewith; and
wherein the first interfaces are sub-interfaces to a first virtual private network (VPN) connection and the second interfaces are sub-interfaces to a second VPN connection.

2. The method of claim 1, wherein the computing environment defines a routing table; and
wherein configuring the computing environment to cause the plurality of workloads programmed to communicate with the external network through the second node comprises replacing a reference to the first node in the routing table with a reference to the second node.

3. The method of claim 1, wherein the NAT state is a NAT table including mappings between private internet protocol (IP) addresses of the plurality of workloads and public IP addresses of the plurality of workloads.

4. The method of claim 1, wherein the first node is connected to a hub node by the first VPN connection, the hub node providing a connection between the first node and the external network; and
wherein the second node is connected to a hub node by the second VPN connection, the hub node providing a connection between the second node and the external network.

5. The method of claim 4, wherein computing environment is a cloud computing environment and the first node and second node execute within a virtual private cloud (VPC) in the cloud computing environment.

6. The method of claim 5, further comprising:
maintaining protocol state machines on the first node for the plurality of workloads;
copying the protocol state machines to the second node; and
in response to detecting failure of the first node, performing by the second node, continuing routing traffic for the plurality of workloads by the second node according to the protocol state machines.

7. The method of claim 6, wherein the protocol state machines are each a transport control protocol (TCP) state machine.

8. The method of claim 7, further comprising configuring the computing environment to cause the plurality of workloads to communicate with the external network through the second node without invoking creation of new TCP sessions by the plurality of workloads.

9. The method of claim 1, further comprising configuring the computing environment to cause the plurality of workloads to communicate with the external network through the second node without invoking creation of new application sessions by the plurality of workloads.

10. The method of claim 1, further comprising:
maintaining, by the first node, a first database including the NAT state;
maintaining, by the second node, a second database; and
synchronizing, by the first node and the second node, the first database with the second database.

11. A method comprising:
executing a plurality of workloads in a computing environment;
executing a first node in the computing environment, the first node being connected to the plurality of workloads and managing network communication between the plurality of workloads and an external network that is external to the computing environment;
generating, by the first node, first network interfaces for the plurality of workloads for communication with the external network;
generating, by a second node executing in the computing environment, second network interfaces for use by the plurality of workloads and having identical private, public, and media access code (MAC) addresses to the first network interfaces;
detecting, by the second node, failure of the first node, the second network interfaces being created prior to failure of the first node;
in response to detecting failure of the first node, performing by the second node:

configuring the computing environment to cause the plurality of workloads to communicate with the external network through the second network interfaces and the second node;

wherein the first network interfaces are sub-interfaces to a first virtual private network (VPN) connection to a hub node connecting the first node to the external network; and wherein the second network interfaces are sub-interfaces to a second VPN connection to the hub node connecting the second node to the external network.

12. The method of claim 11, further comprising:

performing, by the first node, network address translation (NAT) using a first NAT table mapping private addresses of the plurality of workloads used within the computing environment to public addresses used in the external network;

maintaining, by the second node, a second NAT table identical to the first NAT table; and performing NAT by the second node using the second NAT table in response to detecting failure of the first node.

13. The method of claim 11, further comprising:

managing, by the hub node, network address translation (NAT) by creating a first NAT table on the first node, the first NAT table mapping private addresses of the plurality of workloads used within the computing environment to public addresses used in the external network; and creating, by the hub node, a second NAT table on the second node that is identical to the first NAT table.

14. The method of claim 11, wherein the computing environment is a cloud computing platform.

15. The method of claim 14, wherein the first node and the second node execute within a virtual private cloud (VPC) within the cloud computing platform.

16. The method of claim 14, wherein the first node and the second node execute on different computing devices coupled to a same local network.

* * * * *